US006845614B2

(12) United States Patent
Stahlman

(10) Patent No.: US 6,845,614 B2
(45) Date of Patent: Jan. 25, 2005

(54) HYDRAULIC VALVE SYSTEM

(75) Inventor: David B. Stahlman, Mocksville, NC (US)

(73) Assignee: Ingersoll-Rand Company, Woodcliff Lake, NJ (US)

(*) Notice: Subject to any disclaimer, the term of this patent is extended or adjusted under 35 U.S.C. 154(b) by 28 days.

(21) Appl. No.: 10/250,638

(22) PCT Filed: Dec. 27, 2001

(86) PCT No.: PCT/US01/49556

§ 371 (c)(1), (2), (4) Date: Jul. 3, 2003

(87) PCT Pub. No.: WO02/053880

PCT Pub. Date: Jul. 11, 2002

(65) Prior Publication Data

US 2004/0060290 A1 Apr. 1, 2004

Related U.S. Application Data

(60) Provisional application No. 60/259,988, filed on Jan. 5, 2001.

(51) Int. Cl.[7] ................................................ F16D 31/02

(52) U.S. Cl. ............................ 60/468; 60/456; 137/884

(58) Field of Search .......................... 60/396, 456, 494, 60/468; 137/601.14, 601.2, 884

(56) References Cited

U.S. PATENT DOCUMENTS

| | | | | |
|---|---|---|---|---|
| 4,179,888 A | | 12/1979 | Goscenski, Jr. | |
| 4,694,649 A | * | 9/1987 | Howeth | 60/468 |
| 4,941,437 A | | 7/1990 | Suzuki et al. | |
| 4,986,075 A | | 1/1991 | Shimoie | |
| 5,666,807 A | | 9/1997 | Bianchetta | |
| 5,709,247 A | | 1/1998 | Hutton | |
| 5,946,911 A | | 9/1999 | Buschur et al. | |
| 6,339,929 B1 | | 1/2002 | Udagawa et al. | |
| 6,345,501 B1 | | 2/2002 | McKay et al. | |

* cited by examiner

*Primary Examiner*—Thomas E. Lazo

(74) *Attorney, Agent, or Firm*—Michael Best & Friedrich LLP

(57) ABSTRACT

A valve manifold controls hydraulic flow in a hydraulic system for an air compressor unit. The manifold includes a pressure relief valve, a cold oil bypass valve, a proportional flow valve, and an anti-cavitation valve. The pressure relief valve diverts flow away from a fan motor when the pressure of hydraulic fluid within the hydraulic system is above a predetermined level. The cold oil bypass valve diverts flow away from a hydraulic cooler when the temperature of hydraulic fluid within the hydraulic system is below a predetermined level. The proportional flow valve diverts flow away from the fan motor when the temperature of hydraulic fluid within the hydraulic system is below a predetermined level. The anti-cavitation valve prevents pressure build up within the hydraulic system when the air compressor unit is shut off.

20 Claims, 3 Drawing Sheets

Figure 3: Functional Hydraulic System Schematic

HYDRAULIC VALVE SYSTEM

This Patent Application claims the benefit of the earlier filing date of provisional Patent Application No. 60/259,988 filed Jan. 5, 2001.

FIELD OF THE INVENTION

The present invention relates to air compressors, and more particularly to hydraulic systems and valve manifolds for air compressors.

BACKGROUND OF THE INVENTION

In some air compressor units and other similar equipment, a hydraulic system is used to power various components of the unit. A hydraulic pump powered by an engine creates pressure and hydraulic flow and moves hydraulic fluid through the hydraulic system. Portable air compressor units are often exposed to a variety of environments, and hydraulic systems have multiple valves and circuits to control functions that allow the units to operate in extreme temperature ranges. In some prior art air compressor units, these valves are separate in the hydraulic system of the unit. Some air compressor units utilize a valve manifold that combines some of the valves, but these manifolds often require too much space, are too expensive, or do not include all of the valves in a single manifold.

Hydraulic systems for air compressor units may include heat exchangers to cool the hydraulic fluid in the hydraulic system. In some prior art air compressor units, the hydraulic system powers a fan that draws ambient air through the heat exchanger. The air passing through the heat exchanger reduces the temperature of the fluid in the heat exchanger, and the cooled fluid then returns to the hydraulic system. In some prior art air compressor units, multiple heat exchangers are used for various components of the unit. Examples of heat exchangers used in an air compressor unit include a radiator for engine coolant, fuel coolers, hydraulic oil coolers, intercoolers to cool compressed air, aftercoolers to cool discharge air, air end oil coolers, and charge-air coolers to cool turbo charged air.

A problem facing air compressor units operating in low temperatures is freezing in the heat exchangers. Like most equipment, an air compressor takes a period of time to warm-up after it is started. In cold environments, the temperature of fluid in the heat exchangers is relatively low during this initial warm-up period, and drawing cool ambient air through the heat exchanger could reduce the temperature of the fluid below its freezing point. A solution for this problem is to reduce the air drawn through the heat exchangers by blocking the air inlets or louvers. In some prior art air compressor units, the louvers are closed manually to block the air intake. Manual operation of the louvers requires a person to monitor the temperature and manually open the louvers after the temperature of the fluid in the heat exchangers increases. Closing louvers requires additional moving parts, and if the louvers are closed too long, the air compressor unit can overheat.

SUMMARY OF THE INVENTION

Therefore, it is desirable to have a valve manifold that minimizes space and cost, and incorporates multiple valve cartridges into a single valve manifold. Examples of valve cartridges incorporated into the single valve manifold include a pressure relief valve, a cold oil bypass valve, a proportional flow valve, and an anti-cavitation valve. It is also desirable to have an efficient automatic system utilizing existing equipment to reduce the risk of the heat exchangers freezing in cold temperatures.

In the illustrated embodiment, the hydraulic system includes a hydraulic sump, a hydraulic pump, a valve manifold, a fan motor, and a hydraulic cooler. The engine of the air compressor unit powers the pump, which draws fluid from the hydraulic sump and creates a flow through the hydraulic system. Normally, the fluid enters the valve manifold through the main inlet, exits the manifold through the fan supply, powers the fan motor, and returns to the manifold through the fan return. The flow then leaves the manifold through the main outlet or the auxiliary outlet. The flow leaving the main outlet passes through the hydraulic cooler before returning to the hydraulic sump. Flow exiting the manifold through the auxiliary outlet bypasses the hydraulic cooler and flows to the hydraulic sump.

The valve manifold for the hydraulic system contains several valve cartridges in one single efficient body. The incorporated valves include a relief valve, a cold oil bypass check valve, a proportional flow valve, and an anti-cavitation check valve. A single piece of metal, preferably aluminum, is machined to house all of the necessary valve cartridges and passages. The manifold has several apertures and passages in fluid flow communication with each other. The apertures in the manifold include an inlet port, a main outlet, an auxiliary outlet, a fan supply, and a fan return. The lines and piping of the hydraulic system are coupled to the corresponding manifold apertures, and the valves control the hydraulic flow through the manifold.

The valves divert the flow of the hydraulic fluid depending on various operating conditions. The pressure relief valve diverts flow around the fan motor when the pressure within the hydraulic system is above a predetermined level. Generally, the fan motor has a maximum flow pressure that it is designed to accommodate. If the pressure within the hydraulic system is above that maximum flow pressure, hydraulic flow is diverted around the fan motor to maintain the flow pressure below the maximum allowable level, and prevent damage to the fan motor due to excessive pressure.

The proportional flow valve reduces the risk of the heat exchangers freezing in a cold temperature environment. In cold temperatures, the proportional flow valve diverts hydraulic flow to bypass the fan motor, thereby reducing the fan speed and reducing the cool ambient air flow drawn through the heat exchangers. With less cool ambient air passing through the heat exchangers, the fluid within the heat exchangers is less likely to freeze and damage the system. This system for automatically reducing the air flow in cold temperatures does not require manual monitoring, and utilizes existing equipment, so it does not require additional moving parts.

The pressure relief valve and the proportional flow valve are similar because they both alter the flow to the fan motor. However, the relief valve bypasses flow that is above the maximum flow for the fan motor, while the proportional flow valve diverts flow to bring the fan motor below the maximum flow and reduce fan speed.

The cold oil bypass valve controls outlet through which the flow exits the manifold. Normally, the hydraulic fluid exits the manifold through the main outlet and passes through the hydraulic cooler. However, if the temperature of the hydraulic fluid is below a certain temperature, the cold oil bypass valve diverts flow through the auxiliary outlet that bypasses the cooler.

The anti-cavitation valve protects the fan motor from over-pressurization and deadheading. When the engine is turned off, the inertia of the fan causes the fan to continue to rotate. The anti-cavitation valve connects the fan return to the fan supply to create a closed circuit for the fan motor so the fan can slowly come to rest without a pressure build-up in the hydraulic system.

In the illustrated embodiment, the valve manifold combines all of these functions and valve cartridges in one single valve manifold. The preferred embodiment of the invention relates to the hydraulic system in air compressor units. However, the invention is not necessarily limited to air compressor units and could also be incorporated into other similar industrial equipment that use a hydraulic system.

Figure 1:
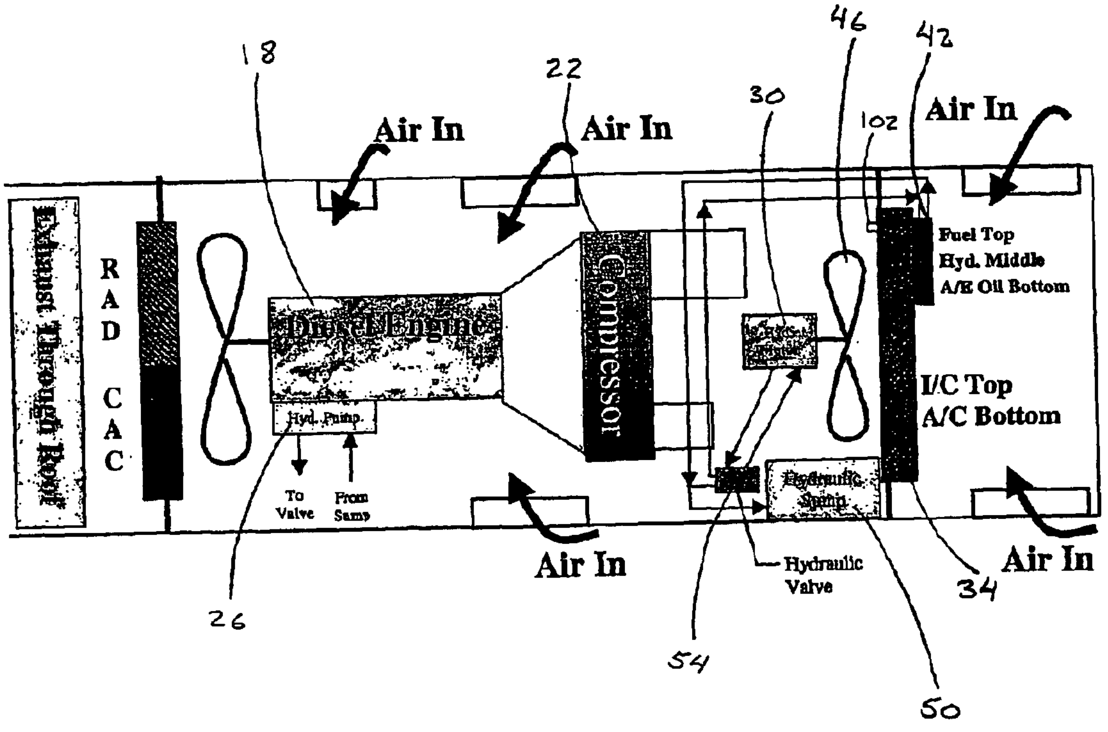
FIG. 1 is a schematic plan view of an air compressor unit with a hydraulic system having a valve manifold and embodying the invention.

Before the embodiments of the invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

FIG. 1 illustrates an air compressor unit 10 having a hydraulic system 14. In the illustrated embodiment, an engine 18 powers a compressor gear box 22 and a hydraulic pump 26. The hydraulic pump 26 creates hydraulic flow through the hydraulic system 14 that powers various components of the air compressor unit 10, including a fan motor 30.

The air compressor unit 10 includes multiple heat exchangers 34 that cool components of the unit 10. The heat exchangers 34 comprise various coolers, including a hydraulic cooler 42 that cools the hydraulic fluid within the hydraulic system 14. The fan motor 30 drives a fan 46 that draws ambient air through the heat exchangers 34. In FIG. 1, the fan 46 is located near the heat exchangers 34.

Figure 2:
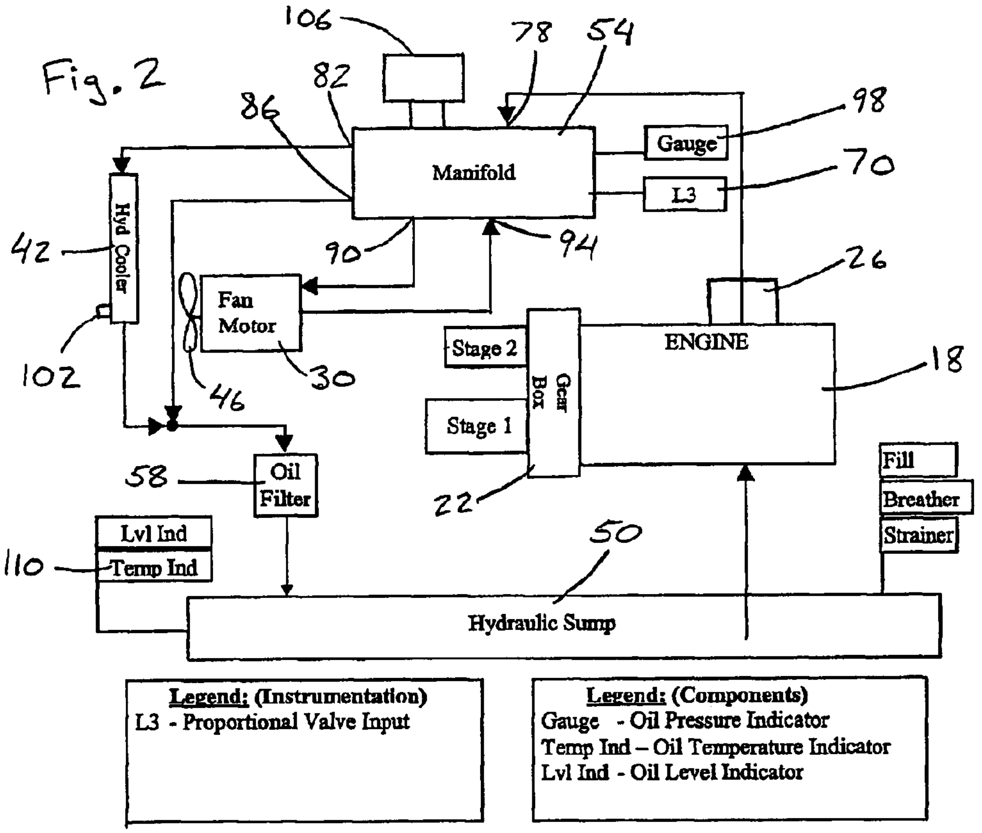
FIG. 2 is a diagram representing the hydraulic system of the air compressor shown in FIG. 1.

FIG. 2 illustrates the hydraulic system 14 of the air compressor unit 10. In the illustrated embodiment, the hydraulic system 14 includes a hydraulic sump 50, the hydraulic pump 26, a valve manifold 54, the fan motor 30, the hydraulic cooler 42, and a filter 58. The hydraulic fluid for the hydraulic system 14 is preferably oil, however other similar fluids could be used in the system.

The hydraulic sump 50 is a reserve that stores hydraulic fluid not flowing through the hydraulic system 14. The hydraulic pump 26 draws fluid from the hydraulic sump 50 to create pressure and hydraulic flow in the system 14. The filter 58 removes impurities from the fluid before the fluid completes the circuit through the system 14 and returns to the sump 50.

Figure 4:
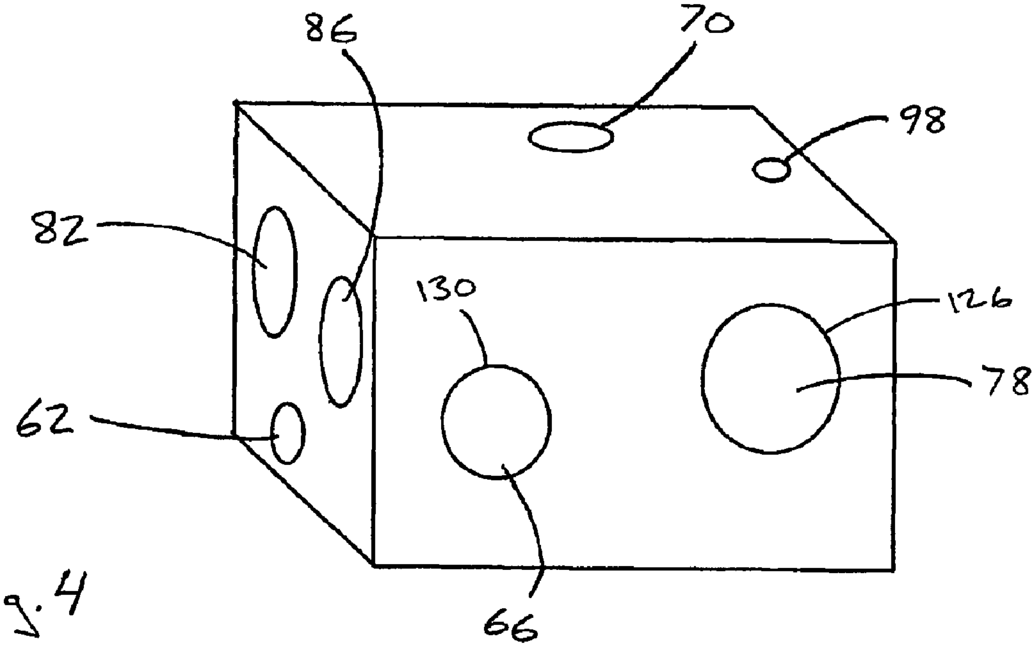
FIG. 4 is a perspective view of a preferred embodiment of the valve manifold used in the hydraulic system shown in FIG. 1.
Figure 5:
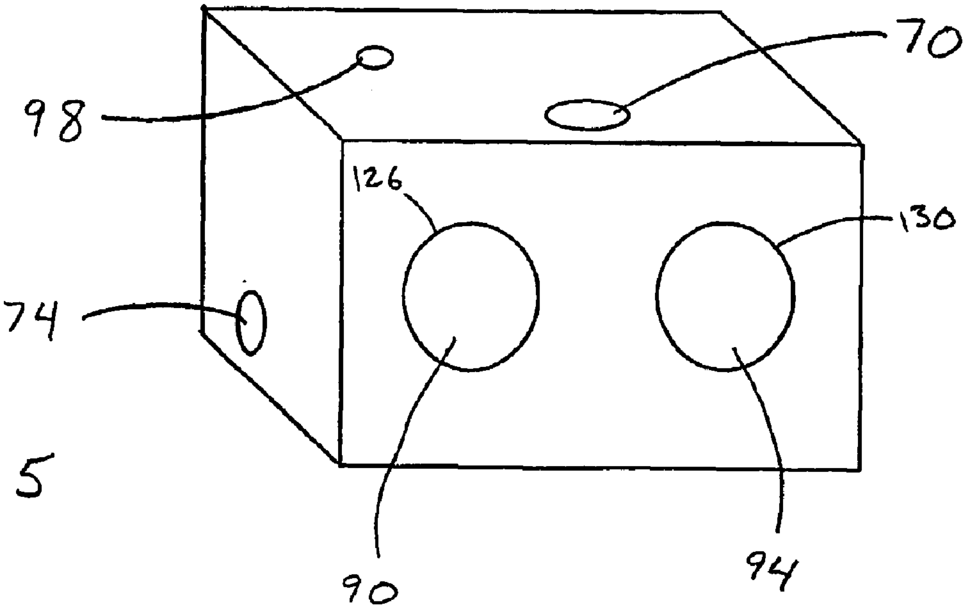
FIG. 5 is a perspective view illustrating the opposite side of the manifold shown in FIG. 4.

Fluid in the hydraulic system 14 passes through the valve manifold 54, which directs the fluid flow depending on certain operating conditions in the system 14, such as temperature and pressure. As shown in FIGS. 4 and 5, the valve manifold 54 houses multiple valve cartridges in one single body. In the illustrated embodiment, the valve manifold 54 includes a pressure relief valve 62, a cold oil bypass 66, a proportional flow valve 70, and an anti-cavitation valve 74. The valves 62, 66, 70 and 74 are described in more detail below.

The manifold 54 is made from a block of metal that is machined to create several apertures and passages within the manifold 54. The apertures and passages contain valve cartridges 62, 66, 70, 74 or remain open to form flow paths through the manifold 54. In the illustrated embodiment, the manifold 54 includes several apertures, including an inlet port 78, a main outlet 82, an auxiliary outlet 86, a fan supply 90, and a fan return 94. The apertures 78, 82, 86, 90, 94 and valves 62, 66, 70, 74 control the hydraulic flow through the manifold 54, and the entire hydraulic system 14. The valve cartridges 62, 66, 70, 74 are easily removable and replaceable. If a valve cartridge fails, the individual cartridge can be removed and replaced without replacing the entire valve manifold 54.

Standard off-the-shelf valve cartridges may be used in the valve manifold 54. The relief valve 62 is preferably a valve manufactured by Sterling Hydraulics of Crewkerne, England, with the part number A04H3HZN. The cold oil bypass 66 is preferably a valve manufactured by Sterling Hydraulics with the part number D06B2H-4IN. The proportional flow valve 70 is preferably a valve manufactured by Hydraforce Hydraulics of Birmingham, England, with the part number PV72-20-0-N-24DG. The anti-cavitation valve 74 is preferably a valve manufactured by Sterling Hydraulics with the part number D04B2-0.2N. The listed valves satisfy the necessary requirements of the hydraulic system, but other similar valves could be used. Other valves could be substituted for the valves used in the preferred embodiment.

In alternate embodiments, the manifold 54 could include additional valves, apertures or passages to control additional operations with the hydraulic system 14. For example, additional supply and return ports could be added to allow the hydraulic system 14 to power additional apparatus, such as a generator, a louver system, or an exhaust cover. The additional supply and return ports would preferably be similar to the fan supply 90 and fan return 94 ports, and could utilize the fluid flow of the hydraulic system 14 to power other hydraulic motors similar to the fan motor 30. Additional valves could be incorporated into the manifold 54 to control flow to the additional apparatus.

Figure 3:
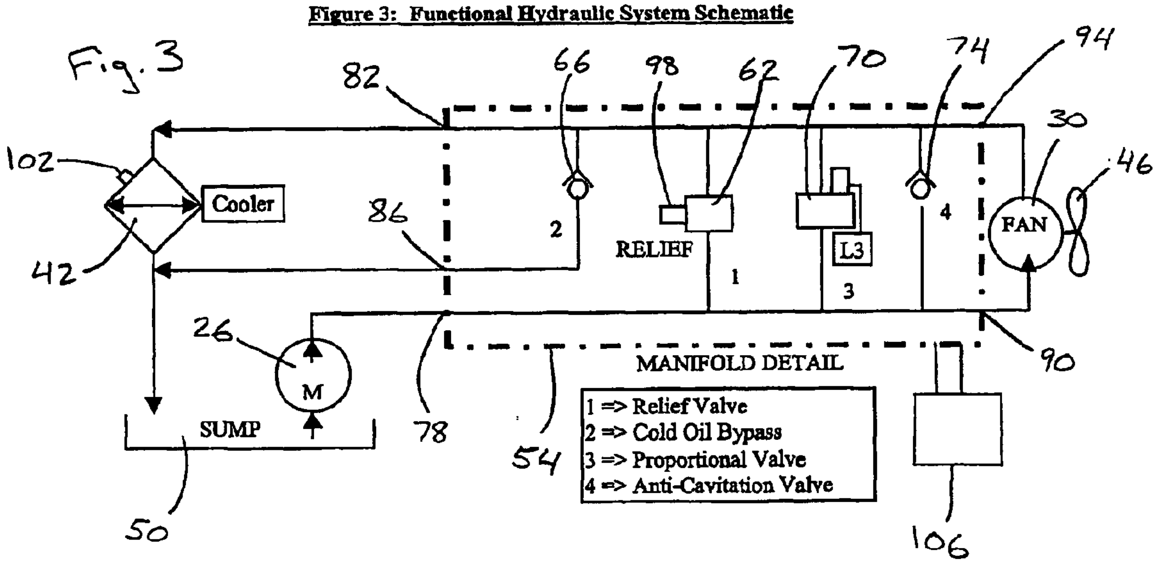
FIG. 3 is a fluid flow schematic illustrating the hydraulic system shown in FIG. 1.

FIGS. 2 and 3 illustrate the hydraulic flow through the hydraulic system 14. The pump 26 draws fluid from the sump 50, and the flow enters the valve manifold 54 through the inlet port 78. Under normal conditions, the flow exits the manifold 54 through the fan supply 90, passes through the fan motor 30, and returns to the manifold 54 through the fan return 94. Finally, the flow exits the manifold 54 through the main outlet 82, and passes through the hydraulic cooler 42 before returning to the sump 36. As described below, flow can also exit the manifold. 54 through the auxiliary outlet 86 and bypass the hydraulic cooler 42. Flow leaving the manifold 54, whether through the main outlet 82 or the auxiliary outlet 86, passes through the oil filter 58 before returning to the hydraulic sump 50. The valves 62, 66, 70, 74 incorporated into the manifold 54 may alter portions of this primary flow path depending on various operating conditions of the system 14, such as pressure and temperature.

FIG. 3 provides a detailed illustration of the hydraulic flow through the valve manifold 54. The hydraulic flow enters the manifold 54 through the inlet port 78. The hydraulic system 14 also includes a controller 106 with a micro-processor that receives inputs from gauges, probes and sensors and adjust the valves 62, 66, 70 and 74 in response to those inputs. The controller 106 may also control the engine speed, fan speed, and overall performance of the compressor unit 10.

In the illustrated embodiment, a pressure gauge 98 measures the pressure of the hydraulic fluid in the hydraulic system 14. A temperature probe 102 measures the temperature in at least one of the heat exchangers 34 (FIG. 1). A temperature gauge 110 is located in the hydraulic sump 50 and measures the temperature of the hydraulic fluid. The controller 106 receives signals from the pressure gauge 98, temperature probe 120 and temperature gauge 110, and actuates the valves 62, 66, 70, 74 to adjust the flow through the hydraulic system 14 in response to the signals.

The pressure relief valve 62 helps prevent the pressure of the hydraulic flow through the fan motor 30 from exceeding the maximum allowable pressure. The fan motor 30 is designed to accommodate a maximum pressure. If the pressure reading from the pressure gauge 98 is greater than the maximum pressure for the fan motor 30, the pressure relief valve 62 diverts flow and alleviates pressure to prevent the pressure in the fan motor 30 from exceeding the maximum allowable pressure. The hydraulic fluid diverted by the relief valve 62 bypasses the fan motor 30 and exits the manifold 54 through the main outlet 82 or the auxiliary outlet 86.

The manifold 54 includes the proportional flow valve 70 that helps prevent the contents of the heat exchangers 34 from freezing and damaging the heat exchangers 34 (FIG. 1). A temperature probe 102 measures the temperature in at least one of the heat exchangers 34 (FIG. 1), and the speed of the fan 46 is adjusted accordingly to control the air flow through the heat exchangers 34 (FIG. 1) depending on the reading from the temperature probe 102. The fan 46 operates at full speed when the maximum hydraulic flow passes through the fan motor 30. If the temperature reading from the temperature probe 102 is below a predetermined level, the proportional flow valve 70 diverts hydraulic flow away from the fan motor 30 to reduce the flow through the fan motor 30 below the maximum flow. Less hydraulic flow to the fan motor 30 decreases the speed of the fan 46, and reduces the amount of air the fan 46 draws through the heat exchangers 34 (FIG. 1).

The proportional flow valve 70 is capable of diverting all of the flow, or none of the flow away from the fan motor 30, and can control the speed of the fan 46 at almost any speed between zero and the maximum speed. The bypass flow through the proportional flow valve 70 bypasses the fan motor 30 and exits the manifold 54 through the main outlet 82 or auxiliary outlet 86. In the illustrated embodiment, the proportional flow valve 70 can handle a larger volume of flow than the relief valve 62. Therefore, when the proportional flow 70 valve is open, the pressure differential will eventually draw all of the flow away from the relief valve 62 and through the proportional flow valve 70. After the proportional flow valve 70 is opened, the pressure in the system 14 will decrease below the maximum, so flow will pass through the proportional flow valve 70 instead of the relief valve 62.

The proportional flow valve 70 is controlled by the controller 106. The controller 106 receives a signal from the temperature probe 102 in the heat exchangers 34 (FIG. 1) and adjusts the proportional flow valve 70 in response to that signal. The controller 106 controls the speed of the fan 46 by actuating the proportional flow valve 70 and varying the flow to the fan motor 30. Since the proportional flow valve 70 bypasses the fan motor 30, an increase in flow through the proportional flow valve 70 reduces the flow through the fan motor 30, and reduces the speed of the fan 46.

The controller 106 preferably takes a reading from the temperature probe 102 at regular time intervals to maintain the temperature in the heat exchangers 34 (FIG. 1) at a desired level. The controller 106 compares the temperature reading to the goal temperature and calculates the necessary adjustments for the proportional flow valve 70. If the reading from the probe 102 is below the goal temperature, the controller 106 opens the proportional flow valve 70 incrementally to gradually decrease the flow to the fan motor 30. If the reading is still below the goal temperature at the next reading, the controller 106 further opens the proportional flow valve 70 to further decrease the flow to the fan motor 30 and further decrease the speed of the fan 46. If the reading from the probe 102 is above the goal temperature, the controller 106 will close the proportional flow valve 70 to increase the flow to the fan motor 30 and increase the speed of the fan 46. This cycle continues until the goal temperature is achieved.

The anti-cavitation valve 74 helps prevent over-pressurization and dead heading of the fan motor 30. When the compressor unit 10 and engine 18 are turned off, the inertia of the fan 46 causes the fan motor 30 to continue rotating. Since the pump 26 and the other components of the hydraulic system 14 are no longer operating after the unit 10 is turned off, the fan motor 30 rotation creates a pressure increase down-stream from the fan motor 30 and a pressure decrease up-stream from the fan motor 30. If the pressure build-up is large enough, it can suddenly stop, or dead head, the fan 46 and possibly damage the fan motor 30 or the hydraulic system 14. To help prevent this problem, the anti-cavitation valve 74 directs flow from the fan return 94 to the fan supply 90 when the engine 18 is shut off to create a closed circuit between the fan motor 30 and manifold 54. Flow returning from the fan motor 30 to the manifold 54 flows back to the fan motor 30. This closed circuit allows the fan 46 to slowly come to a stop and helps prevent a damaging pressure build-up in the hydraulic system 14.

The cold-oil bypass 66 is a low temperature check valve that controls whether the hydraulic flow exits the manifold 54 through the main outlet 82 or the auxiliary outlet 86. In the illustrated embodiment, a temperature gauge 110 is located in the hydraulic sump 50 to measure the temperature of the hydraulic fluid. Normally, the flow exits the manifold 54 through the main outlet 82 and passes through the hydraulic cooler 42 before returning to the hydraulic sump 50. However, if the temperature from the temperature gauge 110 is below a predetermined level, the cold oil bypass 66 diverts flow to bypass the hydraulic cooler 42. Flow bypassing the hydraulic cooler 42 exits the manifold 54 through the auxiliary outlet 86 instead of through the main outlet 82.

The flow from the auxiliary outlet 86 bypasses the hydraulic cooler 42 and leads to the hydraulic sump 50. Some flow is also diverted through the auxiliary outlet 86 if the pressure difference between the flow passing through the main outlet 82 and the auxiliary outlet 86 is too great. In the illustrated embodiment, if the pressure drop between the flow passing through the main outlet 82 and the auxiliary outlet 86 is more than approximately 60 psi, the cold oil bypass 66 will divert additional flow through the auxiliary outlet 86 to reduce the pressure differential.

As shown in FIGS. 4 and 5, the manifold 54 is efficiently configured to minimize the size and weight of the manifold 54. In the illustrated embodiment, the apertures 78, 82, 86, 90, 94 and valves 62, 66, 70, 74 are aligned to simplify the manufacture of the manifold 54 and facilitate cross-drilling. The manifold 54 is preferably made from aluminum which is lightweight, strong, and relatively easy to machine.

In the illustrated embodiment, the manifold 54 is a hexahedron block, and includes an inlet side 114, an outlet side 118, and a fan side 122. The inlet side 114 and the fan side 122 are disposed on opposite sides of the manifold 54, and the outlet side 118 intersects both the inlet side 114 and the fan side 122. The inlet port 78 is disposed on the inlet side 114, and an inlet passage 126 extends through the manifold 54 from the inlet port 78 to the fan supply 90 on the fan side 122. As described above, under normal conditions, hydraulic flow enters the manifold 54 through the inlet port 78, and flows through the inlet passage 126 to the fan supply 90.

The fan supply 90 and the fan return 94 are both disposed on the fan side 122. An outlet passage 130 extends through the manifold 54 from the fan return 94 toward the inlet side 114. As described above, hydraulic flow reenters the manifold 54 through the fan return 94 from the fan motor 30, and the flow enters the outlet passage 130. The main outlet 82 and auxiliary outlet 86 are both in fluid flow communication with the outlet passage 130, and flow may exit the outlet passage 130 through either the main outlet 82 or the auxiliary outlet 86. The main outlet 82 is disposed on the outlet side 118 near the fan return 94, and the auxiliary outlet 86 is also disposed on the outlet side 118. The cold-oil bypass valve 66 is at least partially disposed within the outlet passage 130 and directs flow to either the main outlet 82 or the auxiliary outlet 86 depending on the temperature of the hydraulic fluid.

In the illustrated embodiment, the inlet passage 126 is substantially parallel to the outlet passage 130. The proportional flow valve 70 and the pressure relief valve 62 are in fluid flow communication with the inlet passage 126 and outlet passage 130, and diverts flow from the inlet passage 126 to the outlet passage 130 to bypass the fan motor 30 (FIG. 3) and adjust the speed of the fan 46 (FIG. 3). The pressure relief valve 62 diverts flow from the inlet passage 126 to the outlet passage 130 to bypass the fan motor 30 (FIG. 3) when the hydraulic fluid pressure is above the maximum allowable pressure for the fan motor 30 (FIG. 3). The anti-cavitation valve 74 is in fluid flow communication with the inlet passage 126 and outlet passage 130, and diverts flow from the fan return 94 back to the fan supply 90 when the unit 10 (FIG. 1) is turned off to prevent a pressure build up.

In alternate embodiments, the placement of apertures and passages within the manifold 54 could vary from the illustrated embodiment. However, cross-drilling is an important factor for the aperture and passage placement in the illustrated embodiment to reduce the amount of machining and make the design more efficient.

What is claimed is:

1. A valve manifold for a hydraulic system of a portable air compressor unit, the valve manifold comprising:

a manifold body housing:

a pressure relief valve that diverts flow away from a fan motor when the pressure of hydraulic fluid within the hydraulic system is above a predetermined level;

a cold oil bypass valve that diverts flow away from a hydraulic cooler when the temperature of hydraulic fluid within the hydraulic system is below a predetermined level;

a proportional flow valve that diverts flow away from the fan motor when the temperature of hydraulic fluid within the hydraulic system is below a predetermined level; and an anti-cavitation valve that prevents pressure build up within the hydraulic system when the air compressor unit is shut off.

2. The valve manifold of claim 1, wherein the proportional flow valve automatically reduces hydraulic flow to the fan motor to reduce air flow through the hydraulic cooler when the temperature is below a predetermined level.

3. The valve manifold of claim 1, wherein hydraulic flow exits the manifold through a fan supply to flow to the fan motor, and returns to the manifold from the fan motor through a fan return, and the anti-cavitation valve diverts flow from the fan return to the fan supply to create a closed hydraulic circuit between the manifold and the fan motor when the air compressor unit is shut-off.

4. A valve manifold for a hydraulic system of a portable air compressor unit, the valve manifold comprising:

a manifold body having:

an inlet port disposed on an inlet side of the manifold body, and hydraulic flow from the hydraulic system enters the manifold body through the inlet port;

a main outlet disposed on an outlet side of the manifold body, and hydraulic flow exits the manifold body through the main outlet and flows to a hydraulic cooler;

an auxiliary outlet disposed on the outlet side, and hydraulic flow exits the manifold body through the auxiliary outlet and bypasses the hydraulic cooler;

a fan supply disposed on a fan side of the manifold body, and hydraulic flow exits the manifold body through the fan supply and flows to a fan motor; and a fan return disposed on the fan side, and hydraulic flow from the fan motor reenters the manifold body through the fan return.

5. The valve manifold of claim 4, further comprising a pressure relief valve housed within the manifold body that diverts flow away from the fan supply and the fan motor when the pressure of hydraulic fluid within the hydraulic system is above a predetermined level.

6. The valve manifold of claim 4, further comprising a cold oil bypass valve housed within the manifold body that diverts flow away from the main outlet and the hydraulic cooler when the temperature of hydraulic fluid within the hydraulic system is below a predetermined level.

7. The valve manifold of claim 4, further comprising a proportional flow valve housed within the manifold body that diverts flow away from the fan supply and the fan motor when the temperature of hydraulic fluid within the hydraulic system is below a predetermined level.

8. The valve manifold of claim 4, further comprising an anti-cavitation valve housed within the manifold body that prevents pressure build up within the hydraulic system when the air compressor unit is shut off.

9. The valve manifold of claim 8, wherein the anti-cavitation valve diverts flow from the fan return to the fan supply to create a closed hydraulic circuit between the valve manifold and the fan motor when the air compressor unit is shut-off.

10. A valve manifold for a hydraulic system of a portable air compressor unit, the valve manifold comprising:

a manifold body having:

an inlet side, and an inlet port disposed on the inlet side;

an outlet side, and a main outlet and an auxiliary outlet disposed on the outlet side;

a fan side disposed opposite the inlet side, and a fan supply and fan return disposed on the fan side;

an inlet passage extending through the manifold from the inlet side to the fan side, and in fluid flow communication with the inlet port and fan supply:

an outlet passage extending through the manifold from the inlet side to the fan side and in fluid flow communication with the fan return, main outlet and auxiliary outlet;

a cold oil bypass valve at least partially disposed in the outlet passage;

a pressure relief valve in fluid flow communication with the inlet passage and the outlet passage;

a proportional flow valve in fluid flow communication with the inlet passage and the outlet passage; and an anti-cavitation valve in fluid flow communication with the fan return and fan supply.

11. The valve manifold of claim 10, wherein the cold oil bypass valve directs hydraulic flow to the main outlet and the auxiliary outlet, and diverts flow away from the main outlet and a hydraulic cooler when the temperature of hydraulic fluid within the hydraulic system is below a predetermined level.

12. The valve manifold of claim 10, wherein the pressure relief valve diverts flow away from a fan motor when the pressure of hydraulic fluid within the hydraulic system is above a predetermined level.

13. The valve manifold of claim 10, wherein the proportional flow valve diverts flow away from the fan motor when the temperature of hydraulic fluid within the hydraulic system is below a predetermined level.

14. The valve manifold of claim 10, wherein the anti-cavitation valve prevents pressure build up within the hydraulic system when the air compressor unit is shut off.

15. The valve manifold of claim 14, wherein the anti-cavitation valve diverts flow from the fan return to the fan supply to create a closed hydraulic circuit between the valve manifold and the fan motor when the air compressor unit is shut-off.

16. A hydraulic system for a portable air compressor unit comprising:

a fan motor;

a hydraulic cooler;

a valve manifold comprising a manifold body having:

an inlet port through which hydraulic flow from the hydraulic system enters the manifold body;

a main outlet through which hydraulic flow exits the manifold body and flows to the hydraulic cooler;

an auxiliary outlet through which hydraulic flow exits the manifold body and bypasses the hydraulic cooler;

a fan supply through which hydraulic flow exits the manifold body and flows to the fan motor; and a fan return through which hydraulic flow from the fan motor reenters the manifold body;

a controller;

a pressure gauge that measures fluid pressure and sends a first signal to the controller, and the controller actuates a pressure relief valve housed within the manifold body to divert flow away from the fan supply and the fan motor if the fluid pressure is above a predetermined level;

a temperature gauge that measures fluid temperature and sends a second signal to the controller, and the controller actuates a cold oil bypass valve housed within the manifold body to divert flow away from the main outlet and the hydraulic cooler if the fluid temperature is above a predetermined level; and a temperature probe that measures fluid temperature and sends a third signal to the controller, and the controller actuates a proportional flow valve housed within the manifold body to divert flow away from the fan supply and the fan motor if the fluid temperature is above a predetermined level.

17. The hydraulic system of claim 16, wherein the valve manifold further comprises an anti-cavitation valve housed within the manifold body that diverts flow from the fan return to the fan supply to create a closed hydraulic circuit between the valve manifold and the fan motor and prevent pressure build up within the hydraulic system when the air compressor unit is shut off.

18. The hydraulic system of claim 16, wherein the pressure gauge measures the pressure of hydraulic fluid within the valve manifold.

19. The hydraulic system of claim 16, wherein the temperature gauge measures temperature of hydraulic fluid within a hydraulic sump.

20. The hydraulic system of claim 16, wherein the temperature probe measures fluid temperature within the hydraulic cooler.

* * * * *